(12) United States Patent
Heimberg (10) Patent No.: US 12,466,662 B2
(45) Date of Patent: Nov. 11, 2025

(54) SEPARATING DEVICE (71) Applicant: HTI Automation GmbH, Ebersberg (DE)

(72) Inventor: Wolfgang Heimberg, Ebersberg (DE)

(73) Assignee: HTI Automation GmbH, Ebersberg (DE)

( * ) Notice: Subject to any disclaimer, the term of this patent is extended or adjusted under 35 U.S.C. 154(b) by 70 days.

(21) Appl. No.: 17/987,569

(22) Filed: Nov. 15, 2022

(65) Prior Publication Data

US 2023/0150772 A1     May 18, 2023

(30) Foreign Application Priority Data

Nov. 17, 2021   (DE) .................... 10 2021 129 997.7

(51) Int. Cl.
*B65G 47/32* (2006.01)
*B65G 43/08* (2006.01)
*B65G 47/88* (2006.01)

(52) U.S. Cl.
CPC ............. *B65G 47/32* (2013.01); *B65G 43/08* (2013.01); *B65G 47/88* (2013.01); *B65G 2203/0241* (2013.01); *B65G 2203/044* (2013.01)

(58) Field of Classification Search
CPC ........... B65G 47/32; B65G 2203/0241; B65G 2203/044; B65G 47/1471; B65G 47/1492; B65G 43/08; B65G 47/88; B65G 17/12; B65G 43/10; B65G 47/52; B65G 47/06; B65G 47/22; B07C 5/02; B07C 5/04; B07C 5/14

USPC ......... 198/418, 418.5, 418.6, 459.1; 209/518
See application file for complete search history.

(56) References Cited

U.S. PATENT DOCUMENTS

| 4,094,129 | A | * | 6/1978 | List | B65B 57/20 |
| | | | | | 221/9 |
| 4,645,065 | A | * | 2/1987 | Tomita | F23G 5/444 |
| | | | | | 198/573 |
| 5,236,077 | A | * | 8/1993 | Hoppmann | B65G 47/525 |
| | | | | | 198/395 |
| 5,333,716 | A | * | 8/1994 | Hoppmann | B65G 47/525 |
| | | | | | 198/397.06 |

(Continued)

FOREIGN PATENT DOCUMENTS

| AT | 14034 U1 | 3/2015 | |
| DE | 19839664 A1 | * 3/1999 | ......... B65G 47/1407 |

(Continued)

*Primary Examiner* — Gene O Crawford
*Assistant Examiner* — Muhammad Awais
(74) *Attorney, Agent, or Firm* — HoustonHogle LLP (57) ABSTRACT

A separating device for the provision of one or more conveyed materials, in particular lids, in a predetermined positional state comprises a conveyor device for receiving and transporting lids in one transport direction, with a conveyor belt and several receiving areas formed on the conveyor belt for receiving at least one lid each, the conveyor device being inclined with respect to the horizontal at least in a pre-separation section in such a way that the transport direction is designed for the upward transport of the lids, and wherein the receiving areas are each limited at least downwards by a stud, and a detection device with a (Continued)

detection area for detecting a predetermined positional state and/or for detecting a number of the lids arranged on the conveyor in a respective receiving area.

15 Claims, 3 Drawing Sheets

(56) References Cited

U.S. PATENT DOCUMENTS

| | | | | |
|---|---|---|---|---|
| 5,333,718 A * | 8/1994 | Pannell | ............. | B65G 47/1471 198/397.06 |
| 5,439,093 A * | 8/1995 | Drewitz | ............. | B65G 47/1471 198/408 |
| 5,794,756 A * | 8/1998 | Taylor | ............. | B65G 43/10 198/429 |
| 9,701,485 B2 * | 7/2017 | Fréchette | ............. | B65G 15/44 |
| 11,230,437 B2 * | 1/2022 | Dickfeld | ............. | B65G 47/1478 |
| 2004/0069156 A1 * | 4/2004 | Reed | ............. | B65G 47/642 198/418.6 |
| 2009/0229951 A1 * | 9/2009 | Monti | ............. | B65G 47/1471 198/401 |
| 2011/0315509 A1 * | 12/2011 | Yohe | ............. | G01N 21/9081 198/341.03 |
| 2016/0229642 A1 * | 8/2016 | Mulet Valles | ............. | B65G 47/256 |
| 2018/0148272 A1 * | 5/2018 | Wagner | ............. | B65G 47/902 |

FOREIGN PATENT DOCUMENTS

| | | | | |
|---|---|---|---|---|
| DE | 10340752 A1 * | 3/2005 | ......... | B65G 47/1492 |
| DE | 102004013544 A1 * | 10/2005 | ......... | B65G 47/1485 |
| DE | 202005011756 U1 * | 12/2005 | ............. | B07C 5/342 |
| DE | 102010028840 A1 * | 11/2011 | ............. | B65B 35/24 |
| DE | 102018132637 A1 * | 6/2020 | ............... | B07C 5/02 |
| DE | 102020131870 A1 * | 6/2022 | ............. | B65G 15/14 |
| EP | 2417586 B1 * | 9/2014 | ........... | G07F 7/0609 |
| EP | 3034439 A1 * | 6/2016 | ........... | B65G 47/244 |
| EP | 3595972 B1 * | 4/2022 | ............... | B65B 1/04 |
| ES | 2299316 A1 * | 5/2008 | ........ | B65G 47/1457 |
| FR | 2683214 A1 * | 5/1993 | ............. | B65B 35/08 |
| WO | WO-2008129086 A1 * | 10/2008 | ........ | B65G 47/1457 |
| WO | WO-2017154719 A1 * | 9/2017 | ............. | B65G 25/04 |
| WO | WO 2021008646 | 1/2021 | | |

* cited by examiner

SEPARATING DEVICE

RELATED APPLICATIONS

This application claims priority to German Patent Application No. 10 2021 129 997.7, filed on Nov. 17, 2021, which is incorporated herein by reference in its entirety.

FIELD OF THE INVENTION

The invention relates to a separating device for providing lids, containers or laboratory vessels made of glass or plastic in a predetermined positional state.

BACKGROUND OF THE INVENTION

A conveyor device comprises a conveyor belt (also assembly line, conveyor belt, or in technical terms belt conveyor, belt band conveyor or belt conveyor) and is usually a stationary conveyor system. The conveyor belt is usually friction driven by means of one or more drive pulleys. A conveyor device is suitable for both solid bulk material as well as individually packaged goods. Conveyor devices have a high level of operational safety and have proven themselves in many fields of application.

Vibration helical conveyors (or helical conveyors) are vibration conveyors for vertical conveying. Dusty to coarse-grained bulk material as well as lumpy goods are conveyed. In addition to transport, they are often used to sort small parts in bulk material (e.g. screws, electronic components) or to prepare them in the correct position for automatic further processing.

Such an oscillating conveyor device is known from WO 2021/008646 A1.

SUMMARY OF THE INVENTION

The purpose of the present invention is to provide a conveyor device, in particular a separating device, with which it is possible to provide one or a few conveyed goods, in particular lids, in a predetermined positional state.

In addition, one of the tasks of the present invention is to provide a separating device that is safe and reliable in operation.

In addition, one of the functions of the present invention is to provide a separation device that can be operated as quietly and with as little vibration as possible.

One or more of these tasks are solved by the features of the independent patent claims. Advantageous embodiments are specified in the subclaims depending on them.

According to the invention, a separating device is provided for providing one or more conveyed goods, in particular lids, containers or laboratory vessels made of glass or plastic, in a predetermined positional state. This comprises a conveyor device for receiving and transporting lids in one transport direction, with a conveyor belt and several receiving areas formed on the conveyor belt for receiving at least one lid each, the conveyor device being inclined with respect to the horizontal at least in a pre-separation section in such a way that the transport direction is designed for the upward transport of the lids, and wherein the receiving areas are each limited at least downwards by a stud, and a detection device with a detection area for detecting a predetermined positional state and/or for detecting a number of the lids arranged on the conveyor in a respective receiving area.

With the present invention, a separating device is provided which comprises a detection device for detecting a predetermined positional state and/or a number of the lids arranged on the conveyor device. The fact that a detection device is provided means that the lids are not separated solely by means of a structural design of the receiving areas and corresponding studs, but that the number of lids and/or their positional states are also detected. In this way, the separation device according to the invention is also suitable for different types of conveyed materials, in particular of lids that differ in terms of diameter and height.

Due to the design of a separating device according to the invention with a conveyor device with a conveyor belt, the separating device is designed to be relatively low-vibration and quiet.

Furthermore, the design according to the invention has the advantage that contaminations, such as those that occur in vibration helical conveyors due to friction, are safely and reliably avoided.

By conveying the lids by means of the conveyor device, one or more lids are always arranged in the receiving area. This results in a grouping of the lids in the receiving area, so that one or a few lids are arranged in the respective receiving area. This is referred to below as pre-separation.

In the separating device according to the invention, it can be provided in particular that the pre-separation of individual lids, i.e. the arrangement of one or more lids, is effected by the ascending arrangement of the conveyor device and/or by the structural design of the receiving area. By means of such a pre-separation, one or more lids or a predetermined number of lids can be arranged in the receiving area and in an ideal case excess lids can be discharged.

Preferably, the receiving area is designed in such a way that a perfect separation takes place, so that one lid is arranged for each receiving area.

Since this separating device is used to handle lids (or also other conveyed goods, such as laboratory vessels or containers) with different formats (diameter; height) and/or different weights, it is possible that the receiving areas are designed in such a way that the lids are perfectly separated during upward transport alone, as shown above on the basis of pre-separation.

In the case of small lids in particular, it may be possible for two or more lids to be located in a receiving area after pre-separation. In this case, the detection device and a discharge device are used to detect the multiple lids per receiving area and either all lids of the receiving area are discharged or discharged in such a way that only a single lid remains in the receiving area. This is referred to below as separation.

In the context of the present invention, a lid or a cap preferably means a closure, in particular a screw cap for reaction vessels. The lids can have a diameter of at least 0.5 cm or 1 cm up to a maximum of 3 cm or 5 cm or 7 cm.

In principle, the present invention is also suitable for a wide variety of individually packaged goods and bulk materials. Bulk materials and individual packaged goods are therefore referred to as conveyed goods in the following.

In the context of the present invention, a predetermined positional state is preferably understood to mean a state in which a closed side of a lid, a container or a laboratory vessel rests directly on the conveyor belt. However, alternatively, a reverse arrangement in which an open side of a lid, container or laboratory vessel rests directly on the conveyor belt may also be provided. For other conveyed goods, of course, another suitable predetermined positional state can be provided.

By means of the detection device, as soon as a receiving area is arranged in a detection area of the detection device after the pre-separation, it is then checked whether a predetermined number of lids, preferably one lid, is arranged per receiving area and whether this/these is/are arranged in the predetermined positional state.

A detection area is an area or a section of the conveyor device that is arranged downstream in the transport direction from the area in which the pre-separation takes place. As soon as a corresponding receiving area is arranged in the detection area, the number and/or position of the lids in this receiving area can be defined by means of the detection device.

An incorrect position is understood to be a positional state of a lid that does not correspond to the intended or predetermined positional state. For example, if a lid is arranged at an angle in the receiving area or rests on the conveyor belt with an incorrect side.

In the context of the present invention, a stud is understood to be a holding structure arranged on a conveyor belt and connected to it. By means of the studs, the individual adjacent receiving areas of the conveyor belt are structurally and spatially separated from each other.

Preferably, the separating device comprises a discharge device with a discharge section for removing one or more lids from a receiving area of the conveyor belt. The ejection device can be designed, for example, as a sliding device with a corresponding actuator or as a pneumatic nozzle device.

By means of such a discharge device, lids that are arranged on the conveyor belt in an incorrect positional state and/or excess lids from a corresponding receiving area can be removed. In this way, a perfect separation is then achieved.

The discharge section is located downstream of the detection area in the transport direction.

Thus, the different areas are arranged in the transport direction in the following order, first the pre-separation section, then the detection section and finally the discharge section.

The detection device can generate a detection signal when a predetermined number of lids in a receiving area is exceeded and/or when one or more lids are not arranged in the predetermined position in one of the receiving areas, wherein a control device is provided that receives the detection signals from the detection device and controls the discharge device on the basis of these detection signals in order to remove one or more lids from a receiving area.

Thus, according to the invention, a receiving area arranged in a detection area is checked by means of the detection device, and as soon as a predetermined number of lids in a receiving area is exceeded and/or if one or more lids are not arranged in the predetermined position in the receiving area, a detection signal is generated.

This detection signal is then received by a control device, which then controls the discharge device based on these detection signals in order to remove one or more lids from a receiving area.

In a top view, the stud or the holding structure may extend orthogonal to a surface of a conveyor belt of the conveyor device approximately orthogonal to the direction of transport or may be inclined with respect to the direction of transport. Boundary walls extending parallel to the transport direction can be arranged on one or both sides next to the conveyor belt to limit the receiving area. A stud can be V-shaped in a top view orthogonal to a surface of the conveyor belt.

By means of the above-mentioned structural design, the receiving area is designed in such a way that at least one (or more) lid (lids) can be held safely and reliably in a receiving area in the predetermined positional state.

Preferably, the receiving area can be designed or dimensioned or structurally configured and/or limited by at least one stud in such a way that only a single lid can be arranged in a receiving area.

Preferably, a stud spacing in the transport direction extends in the range between at least 1.2 or 1.3 or 1.4—and at most 1.5 or 1.6 or 1.7 or 1.8 or 1.9—times a diameter of the conveyed material or a lid diameter or a diameter of a container or laboratory vessel, and in particular less than twice the diameter of the lid.

In this way, only one lid can ever be arranged in a receiving area between two adjacent studs.

According to an alternative embodiment, it can also be provided that two or more lids can be arranged in a receiving area in a predetermined positional state.

A height of the holding structure or a stud orthogonal to the surface of the conveyor belt is selected in such a way that as soon as two lids are arranged one above the other, the upper lid falls back down into the storage container due to the ascending arrangement of the conveyor belt.

A preferred stud height orthogonal to a surface of the conveyor system is at least approximately 10% or 20% or 25% or 33% or 50% or 60% or 75% or 100% and at most 110% or 125% or 150% of a height of a conveyed material.

The holding structures preferably do not extend over the entire width of the conveyor device. They may be arranged either centrally or preferably at a lateral edge of a conveyor belt of the conveyor device.

The free space next to the holding structures on the conveyor device can then also be provided for discharging conveyed material that cannot be arranged in a receiving area.

In this case, a side wall section adjacent to the studs can limit the conveyor device in order to support or guide the conveyed material in addition to the holding structures.

The holding structures can be arranged in a top view from above or orthogonal to the conveyor belt of the conveyor device in an approximately rectangular or V-shaped or U-shaped or semi-circular shape.

In addition, the rectangular holding structures may be arranged diagonally from one edge of the conveyor device in a top view in the transport direction or ascending in the transport direction. Such an arrangement can be referred to as a half-V-shaped configuration.

The detection device may comprise at least one first sensor device for detecting the number and/or the position of the lids, wherein a sensor of the sensor device is an optical sensor, such as a camera, in particular a stereo camera, a color sensor, a distance sensor, a light barrier or a 3D sensor with acoustical logging or triangulation.

Furthermore, the detection device may comprise a second sensor device for triggering the receiving area in the detection area ("focusing"), wherein one sensor of the second sensor device is an optical sensor. A trigger sensor with an incremental encoder is provided as the optical sensor. Basically, the same sensors are suitable for this purpose as for the first sensor device.

In addition, a storage container can be provided in which the conveyed material or the lids can be stored, whereby the conveyor device, for example, is arranged in the storage container or coupled thereto in such a way that lids can be discharged from the storage container by means of the conveyor device.

The storage container can be connected to a pre-hopper for placing lids in the storage container, the prehopper having a slide so that the lids can be inserted from the pre-hopper into the storage container through an opening of the slide.

Furthermore, an output device can be provided with an output area which opens into a chute means and which is arranged downstream of the detection area and the discharge section, wherein the output device is designed as an output element arranged parallel to a surface of the conveyor belt, wherein the output element, in a top view orthogonal to a surface of a conveyor belt, comprises an output edge inclined with respect to the transport direction, or wherein the output direction is a sliding device or a nozzle device.

The output area is arranged downstream of the discharge section in the transport direction.

According to an advantageous further development of the separating device according to the invention, a discharge transport device for receiving and further transporting conveyed material can also be provided. This discharge transport device also represents a separate independent idea of the invention.

The discharge transport device comprises a conveyor belt device for receiving and further transporting lids in a discharge transport direction, with a conveyor belt, wherein the conveyor belt device comprises a receiving section and a transport section adjacent thereto, and wherein the receiving section of the conveyor belt device is inclined in such a way that a chute means can be coupled to it so that the conveyed material can continuously slide from the chute means onto the conveyor belt device in the receiving section, wherein the conveyor belt in the receiving section is aligned with its transport direction approximately orthogonal to the sliding direction, and a stop device, the stop device being arranged on the side of the conveyor belt opposite the chute means in the receiving section and being designed to stop conveyed material slipping from the chute means onto the conveyor belt.

This means that the stop device is arranged at a lower edge of the inclined receiving section.

In such conveyor devices known from the state of the art, buffer areas are mostly provided to push the conveyed material onto a horizontal conveyor belt by means of a back pressure. To change the conveyed material or the lids, such a buffer area must always be emptied.

By providing a discharge transport device according to the invention, such buffer areas are no longer necessary, since the coupling of the conveyor belt of the conveyor belt device to the chute means allows an automatic further transport of the conveyed material or of lids by gravity alone or by the inclination of the chute means and of the receiving section of the conveyor belt device.

Preferably, the conveyor belt is twisted or turned in a transition from the receiving section to the transport section in such a way that the conveyor belt inclined in the receiving section is arranged horizontally in the transport section.

Accordingly, a twist angle from the inclined receiving section of the conveyor belt to the transport section is always a sharp angle less than 90°.

Furthermore, according to the invention, a method for separating and providing lids is provided, in particular with a separating device shown above. The method comprises the following steps:
Providing lids in a storage container,
Conveying the lids from the storage container by means of a conveyor device,
Pre-separating of the lids by means of an ascending arrangement of the conveyor device and/or by means of a structural design of a receiving area of the conveyor device,
Detection of the number and/or position of the lids in a receiving area arranged in a detection area by means of a detection device.

Preferable, the method according to the invention may further comprise the following steps:
Generating a detection signal by means of the detection device when a predetermined number of lids in a receiving area is exceeded and/or when one or more lids are not arranged in the predetermined position in one of the receiving areas, wherein a control device is provided that receives the detection signals from the detection device and controls the discharge device on the basis of these detection signals in order to remove one or more lids from a receiving area when this receiving area does not contain the predetermined number of lids and/or one or more incorrectly oriented lids.
Discharge of one or more lids from a receiving area arranged in a discharge section by means of a discharge device.
Output of one or more lids from a receiving area arranged in an output area using an output device.
Further transport of the lid or lids by means of a chute means Furthermore, according to the invention, a method is provided for receiving and further transporting conveyed material, preferably lids, in particular according to the above-mentioned method, with a discharge transport device shown above. This comprises the following steps:
Receiving lids from a chute means by means of a conveyor belt device, the conveyor belt device comprising a receiving section and a transport section adjacent to it, and the receiving section of the conveyor belt device being inclined in such a way that a chute means can be coupled to it, so that the material to be conveyed can slide continuously from the chute means onto the conveyor belt device in the receiving section, the conveyor belt in the receiving section being aligned with its transport direction approximately orthogonal to the sliding direction, and stopping the conveyed material sliding from the chute means onto the conveyor belt by means of a stop device, whereby the stop device is arranged on the opposite side of the conveyor belt in the receiving section on the chute means.

Preferable, the method according to the invention may further comprise the following step: Transferring the conveyed material from the receiving section, wherein the conveyor belt is twisted in a transition from the receiving section to the transport section in such a way that the conveyor belt inclined in the receiving section is arranged horizontally in the transport section, so that the conveyed material is discharged in the horizontal direction.

BRIEF DESCRIPTION OF THE DRAWINGS

The present invention is described in more detail below with reference to exemplary embodiments shown in the figures. These show in.

DETAILED DESCRIPTION OF THE PREFERRED EMBODIMENTS

Figure 1:
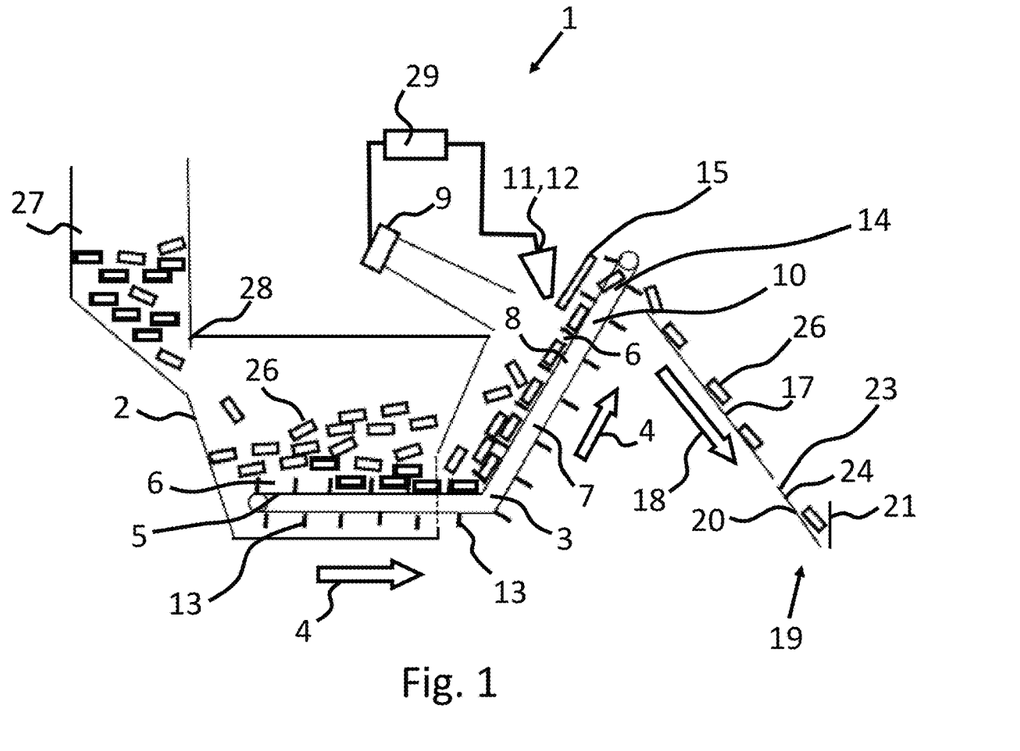
FIG. 1 is a schematic diagram of a separating device according to the invention in a lateral view.

In the following, a separating device 1 according to the invention is described in more detail on the basis of an embodiment example (FIG. 1). The separating device 1 is provided for providing one or more lids in a predetermined positional state.

The separating device 1 has a storage container 2 for holding material to be conveyed, in particular lids 26 or caps.

The storage container 2 is connected to a pre-hopper 27 for inserting lids into the storage container 2. The pre-hopper 27 comprises a slide 28, so that the lids 26 can be inserted from the pre-hopper 27 into the storage container 2 through an opening of the slide 28.

A conveyor device 3 for receiving and transporting lids 26 in a transport direction 4 is arranged in sections in the storage container 2.

The conveyor device 3 comprises a conveyor belt 5 on which a plurality of receiving areas 6 arranged adjacent to one another are formed for receiving at least one lid 26 in each case.

In addition to the conveyor belt, the conveyor device 3 also comprises the usual components required for forming conveyor devices, such as, for example a supporting structure made of structural steel sections; it carries the conveyor roller bearings of the upper and lower run, the drive and tensioning devices; drive station (drive roller, often rubberized, bearings, gears, engine, with or without coupling); reversing station; conveyor rollers, usually in three parts and with toe-in; lower belt rollers; guide rollers; conveyor belt; tensioning station; receiving station; discharge station with transfer funnel; scraper. Even if not all the features of conveyor device 3 are described in detail below, a subject matter expert knows which components are required to form such a device.

The conveyor device 3 or the conveyor belt 5 is inclined, at least in certain areas, at a predetermined angle with respect to the horizontal in such a way that the transport direction 4 is designed for the upward transport of the lids 26.

The pre-determined angle is an angle between 85° and 35° or between 85° and 45° or between 85° and 75° and preferably of approximately 80°.

A pre-separation section 7 is formed on the conveyor device 3. The pre-separation section 7 is formed in an area in which the conveyor belt is arranged in an ascending manner, whereby receiving areas 5 arranged in the pre-separation section 7 or the lids 26 arranged therein are subject to pre-separation. This is achieved by the ascending arrangement of the conveyor device 3 and/or by the structural design of the receiving area 6, in order to arrange one or more lids 26 or a predetermined number of lids 26 in the receiving areas 6 and to discharge excess lids 26.

Adjacent to the pre-separation section 7, a detection section 8 is connected to it in transport direction 4.

In addition, a detection device 9 is provided, which is designed to detect a predetermined positional state or a predetermined position and/or a number of lids 26 arranged on the conveyor device 3 in a respective receiving area 6.

The detection device 9 comprises a first sensor device (not shown) for detecting the number and/or the position of the lids, wherein a sensor of the sensor device is an optical sensor, such as a camera, in particular a stereo camera, a color sensor, a distance sensor, a light barrier or a 3D sensor with acoustical logging or triangulation.

Furthermore, the detection device 9 comprises a second sensor device (not shown) for triggering the receiving area in the detection area ("focusing"), wherein one sensor of the second sensor device is an optical sensor. A trigger sensor with an incremental encoder is provided as the optical sensor. Basically, the same sensors are suitable for this purpose as for the first sensor device.

As soon as a detection area 6 is arranged in the detection section 8, this receiving area 6 is detected by means of the detection device 9.

A discharge section 10 follows the detection section 8 in transport direction.

A discharge device 11 is provided in the discharge section 10. The discharge device 11 is provided for removing one or more lids from a receiving area of the conveyor belt. Preferably, the discharge device is designed as a slide device 12 with an actuator to avoid unnecessary turbulence of dust or the like.

The detection device 9 and the discharge device 11 are connected to a control device 29.

The detection device 9 generates a detection signal when a predetermined number of lids are exceeded in a receiving area and/or when one or more lids are not arranged in the predetermined position in a receiving area.

The control device 29 is provided to receive the detection signals from the detection device and to control the discharge device on the basis of these detection signals in order to remove one or more lids from a receiving area 6. In this way the separation is carried out.

The receiving areas 6 are designed and/or limited by at least one stud 13 in such a way that only a single lid can be arranged in a receiving area.

For this purpose, a corresponding stud distance between two adjacent studs in the transport direction 4 is approximately between 1.2—and 1.5—times a lid diameter, but in particular less than 2. Of course, this also depends on the diameter of the lid.

The receiving areas 6 are preferably limited by the studs 13 or holding structures.

In a top view, a stud 13 extends orthogonally to a surface of conveyor belt 5 of the conveyor device 3 approximately orthogonal to the transport direction 4.

Figure 5:
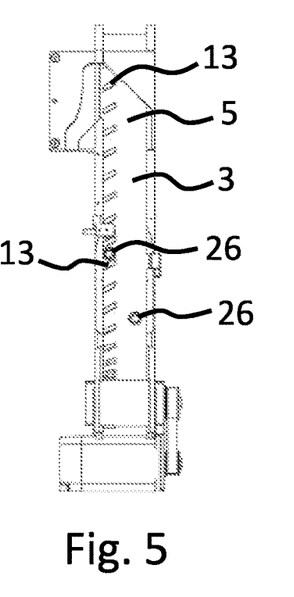
FIG. 5 is a top view of a further embodiment example of a transport conveyor device according to the invention.
Figure 6:
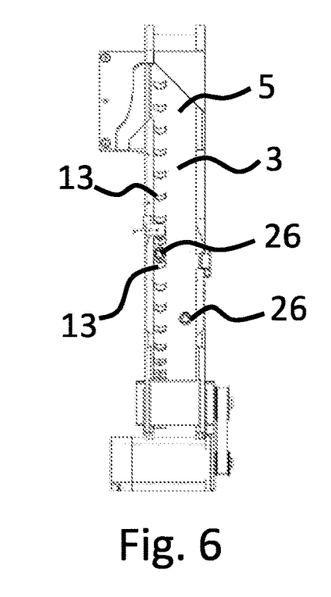
FIG. 6 is a top view of a further embodiment of a conveyor device according to the invention.
Figure 8:
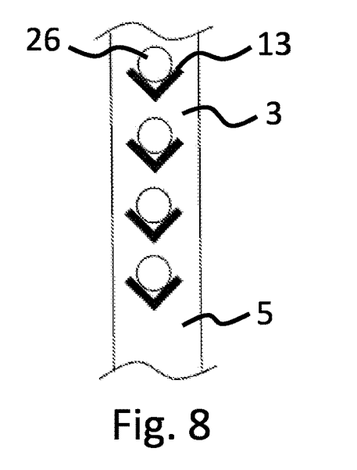
FIG. 8 is a schematic top view of a further embodiment of a conveyor device according to the invention.

Alternatively, it can also be inclined with respect to the transport direction (FIG. 5) or be V-shaped in a top view orthogonal to a surface of the conveyor belt 5 (FIGS. 6 and 8).

A preferred stud height of the holding structures or studs 13 orthogonal to a surface of the conveyor device 3 is at least approximately 10% or 20% or 25% or 33% or 50% or 60% or 75% or 100% and at most 110% or 125% or 150% of a height of a conveyed material.

The holding structures 13 preferably do not extend over the entire width of the conveyor device 3. They may be arranged either centrally or preferably at a lateral edge of the conveyor belt 5 of the conveyor device 3.

The free space next to the holding structures 13 on the conveyor device 3 is then provided for the discharge of conveyed material 26 that cannot be arranged in a receiving area 6. In this case, a boundary wall (not shown) is provided adjacent to the studs 13 in order to limit the conveyor device 3 to support or guide the conveyed material 26 in addition to the holding structures.

Figure 4:
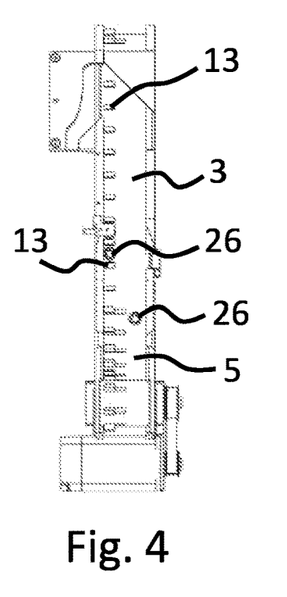
FIG. 4 is a top view of an embodiment of a conveyor device according to the invention of the separating device according to the invention.
Figure 7:
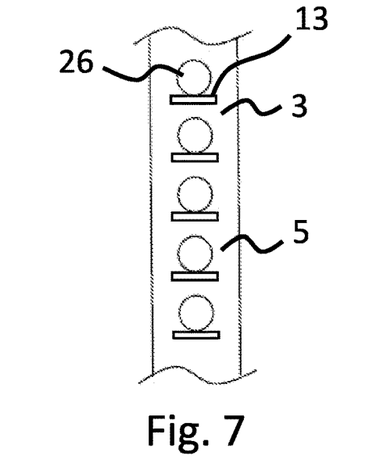
FIG. 7 is a schematic top view of a further embodiment of a conveyor device according to the invention.
Figure 9:
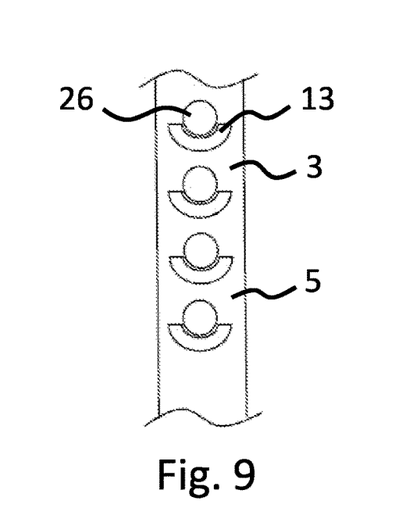
FIG. 9 is a schematic top view of a further embodiment of a conveyor device according to the invention.
Figure 10:
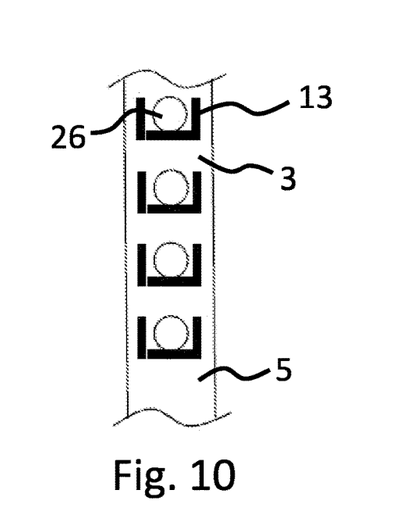
FIG. 10 is a schematic top view of a further embodiment of a conveyor device according to the invention.
Figure 11:
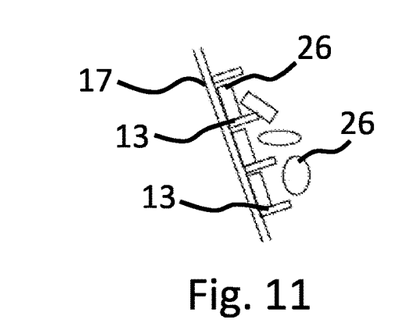
FIG. 11 is a schematic side view of a further embodiment of a conveyor device according to the invention.
Figure 12:
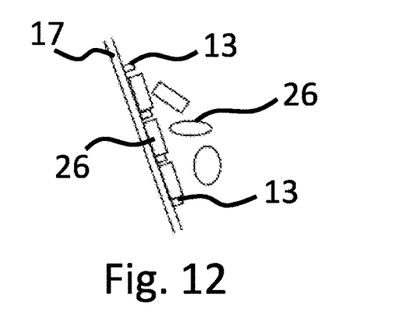
FIG. 12 is a schematic side view of a further embodiment of a conveyor device according to the invention.

The holding structures 26 can be arranged in a top view from above or orthogonal to the conveyor belt 5 of the conveyor device 3 in an approximately rectangular (FIGS. 4 and 7) or V-shaped (FIGS. 6 and 8) or U-shaped (FIG. 10) or semi-circular shape (FIG. 9).

In addition, the rectangular holding structures 26 may be arranged diagonally from one edge of the conveyor device 3 in a top view in the transport direction 4 or ascending in the transport direction 4. Such an arrangement can be referred to as a half-V-shaped configuration.

In the present case, boundary walls (not shown) extending parallel to the transport direction 4 are arranged on both sides next to the conveyor belt to limit the receiving area 6.

When an inclined stud 13 is provided, a single limiting chance may be sufficient. If the studs 13 are V-shaped in a top view orthogonal to a surface of the conveyor belt 5, no limited changes are usually necessary. However, these may also be optionally provided.

An output area 14 is connected to the discharge section 10 in the transport direction 4. An output device 15 is arranged in the output area 14. The output device 15 is preferably designed as an output element 16 arranged parallel to a surface of the conveyor belt. The output device 15 can also be designed as a sliding device or a nozzle device.

By means of the output device 15, one or more lids 26 can be removed from a corresponding receiving area 6. The output area 14 empties into a chute means 17.

The chute means 17 is arranged or inclined in a descending manner relative to the horizontal in such a way that a slide direction 18 is formed in an in descending manner.

A discharge transport device 19 is attached to the chute means 17, which, as already shown above, represents a separate inventive concept.

Figure 2:
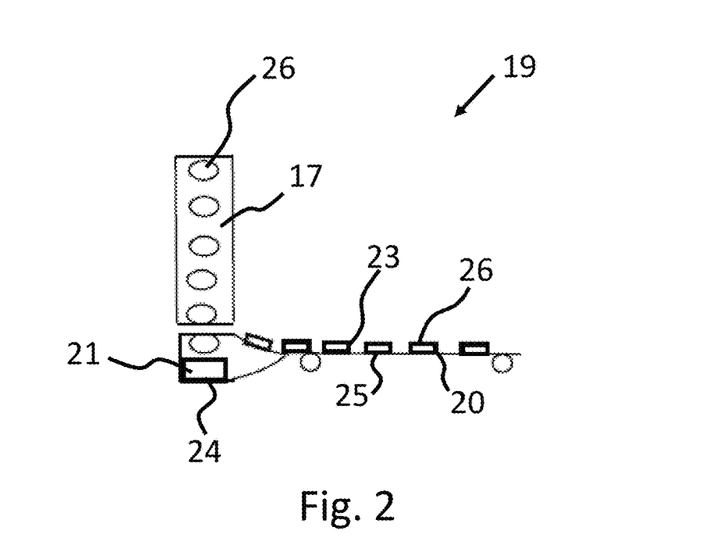
FIG. 2 is a schematic diagram of a discharge transport device according to the invention in a further lateral view.

The discharge transport device 19 comprises a conveyor belt device 20 and a stop device 21 (FIGS. 1 and 2).

The conveyor belt device 20 is designed for receiving and transporting conveyed material.

For receiving conveyed material, the conveyor belt device 20 comprises a receiving section 24 in which a conveyor belt 23 with a transport direction 22 is arranged orthogonal to the slide direction 18, with the conveyor belt 23 in receiving section 24 comprising approximately the same inclination as the slide device 17. It is of crucial importance here that the conveyor belt 23 in the receiving section 24 is inclined in such a way that the conveyed material conveyed on the chute means 17, in particular lids 26, automatically slide onto the conveyor belt 23 in the receiving section 24.

The stop device 21 is arranged on the side of the conveyor belt 23 opposite the chute means 17 in the receiving section 24. The stop device 21 can be designed as a plate-shaped element, which extends in an approximately vertical direction in order to stop the conveyed material on the receiving section.

The receiving section 24 merges into a transport section 25 arranged adjacent thereto.

The conveyor belt is twisted in a transition from the receiving section 24 to the transport section 25 in such a way that the conveyor belt inclined in the receiving section 24 is arranged horizontally in the transport section 25. Thus, the conveyor belt has a changing inclination relative to the horizontal over its length, being inclined relative to the horizontal at least in certain areas in the receiving section and being arranged horizontally at least in certain areas in the transport section.

Figure 3:
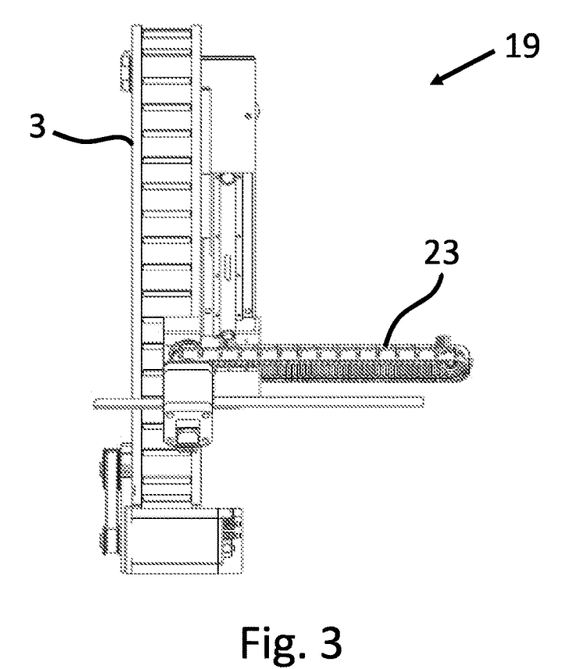
FIG. 3 is a lateral representation of a further embodiment of the discharge transport device according to the invention.

According to an alternative embodiment, the conveyor belt 23 of the discharge transport device is not twisted, but is normal or planar and straight.

In the following, a method according to the invention for separating and providing lids with a separating device shown above is described.

First, the lids are provided in a storage container.

Subsequently, the lids are conveyed from the storage container by means of a conveyor device and arranged on a conveyor belt.

Thereafter, a pre-separating of the lids is performed by means of an ascending arrangement of the conveyor device and/or by a structural design of a receiving area of the conveyor device.

Finally, the number and/or position of the lids in a receiving area arranged in a detection area are detected by means of a detection device.

In this way, a detection signal is generated by means of the detection device when a predetermined number of lids are exceeded in a receiving area and/or when one or more lids are not arranged in the predetermined position in one of the receiving areas.

A control device is provided, which receives the detection signals from the detection device and controls a discharge device on the basis of these detection signals to remove one or more lids from a receiving area if this receiving area does not contain the predetermined number of lids and/or one or more incorrectly oriented lids.

Then, one or more lids are removed from a receiving area arranged in a discharge section by means of a discharge device.

One or more lids are then discharged from a receiving area arranged in an output area using an output device.

The lid or lids are then discharged from the output area by means of a chute means.

In the following, a method according to the invention for receiving and further transporting conveyed material, in particularly lids, according to the above-mentioned method, with a discharge transport device shown above, is explained.

First, the lids are received by a chute means using a conveyor belt device, the conveyor device comprising a receiving section and a transport section adjacent thereto. The receiving section of the conveyor belt device is inclined in such a way that a chute means can be coupled to it, so that material to be conveyed can slide continuously from the chute means onto the conveyor belt device in the receiving section. In the receiving section, the conveyor belt is aligned with its transport direction approximately orthogonal to the slide direction.

Then the lids sliding from the chute means onto the conveyor belt are stopped by means of a stop device. The stop device is arranged on the opposite side of the conveyor belt to the chute means in the receiving section.

The lids are then transferred from the receiving section to the transport section by means of the conveyor belt device, so that the conveyed material is discharged in the horizontal direction.

The conveyor belt is twisted in a transition from the receiving section to the transport section in such a way that the conveyor belt inclined in the receiving section is arranged horizontally in the transport section.

The devices according to the invention and the methods according to the invention are in principle also suitable for other types of conveyed material.

REFERENCE LIST

1 Separating device
2 Storage container
3 Conveyor device
4 Feeding direction
5 Conveyor belt
6 Receiving area
7 Separation section
8 Detecting section
9 Detecting device
10 Discharge section
11 Discharge device
12 Sliding device
13 Studs
14 Output area
15 Output device
16 Output element
17 Chute means
18 Slide direction
19 Discharge transport device
20 Conveyor belt device
21 Stop device
22 Feeding direction
23 Conveyor belt
24 Receiving section
25 Transport section
26 Transported material
29 Control device

The invention claimed is:

1. A separating device for providing of one or more conveyed materials, comprising
a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and
a detection device with a detection area for detecting a predetermined positional state and/or for detecting a number of the lids arranged on the conveyor device in a respective receiving area;
wherein the detection device generates a detection signal when a predetermined number of lids in a receiving area is exceeded and/or when one or more lids are not arranged in the predetermined position in one of the receiving areas, wherein a control device is provided that receives the detection signals from the detection device and controls a discharge device on the basis of these detection signals in order to remove one or more lids from a receiving area.

2. The separating device according to claim 1, wherein the discharge device comprises a discharge section and is provided for removing one or more lids from a receiving area of the conveyor belt, the discharge device being a slide device or a nozzle device.

3. A separating device for providing of one or more conveyed materials, comprising
a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and
a detection device with a detection area for detecting a predetermined positional state and/or for detecting a number of the lids arranged on the conveyor device in a respective receiving area, wherein the detection device has at least one first sensor device for detecting the number and/or the position of the lids, with one sensor of the first sensor device being a camera, a color sensor, a distance sensor, or a 3D sensor with acoustical logging or triangulation;
wherein the detection device comprises a second sensor device for triggering the detection area in the receiving area, wherein a sensor of the second sensor device is a trigger sensor with incremental encoder.

4. The separating device according to claim 1, wherein the receiving area is designed and/or limited by at least one stud in such a way that only a single lid can be arranged in a receiving area.

5. The separating device according to claim 3, wherein the detection device generates a detection signal when a predetermined number of lids in a receiving area is exceeded and/or when one or more lids are not arranged in the predetermined position in one of the receiving areas, wherein a control device is provided that receives the detection signals from the detection device and controls a discharge device on the basis of these detection signals in order to remove one or more lids from a receiving area.

6. The separating device according to claim 1, wherein a storage container is provided in which the lids can be stored, wherein the conveyor device is arranged in the storage container or is coupled thereto in such a way that lids can be discharged from the storage container by means of the conveyor device.

7. A separating device for providing of one or more conveyed materials, comprising
a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and a detection device with a detection area for detecting a predetermined positional state and/or for detecting a number of the lids arranged on the conveyor device in a respective receiving area;
   wherein an output device with an output area which opens into a chute and which is arranged downstream of the detection area and a discharge section, wherein the output device is designed as an output element arranged parallel to a surface of the conveyor belt, wherein the output element, in a top view orthogonal to a surface of the conveyor belt, comprises an output edge inclined with respect to the transport direction, or wherein the output device is a sliding device or a nozzle device.

8. A discharge transport device for receiving and further transporting conveyed material, for a separating device for providing of the conveyed material, the separating device comprising
   a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and
   a detection device with a detection area for detecting a predetermined positional state and/or for detecting a number of the lids arranged on the conveyor device in a respective receiving area;
   wherein the conveyor device further transports conveyed material in a discharge transport direction, with a conveyor belt, wherein the conveyor device comprises a receiving section and a transport section being adjacent to it, and the receiving section of the conveyor device being inclined in such a way that a chute can be coupled to it, so that the material to be conveyed can slide continuously from the chute onto the conveyor device in the receiving section, the conveyor belt in the receiving section being aligned with its transport direction approximately orthogonal to the sliding direction, and
   wherein a stop device is provided, wherein the stop device is arranged on the opposite side of the conveyor belt in the receiving section on the chute, and which is designed to stop conveyed material sliding from the chute onto the conveyor belt.

9. The discharge transport device according to claim 8, wherein
   the conveyor belt is twisted in a transition from the receiving section to the transport section in such a way that the conveyor belt inclined in the receiving section is arranged horizontally in the transport section.

10. A method for separating and providing lids with a separating device for providing of one or more of the lids, the separating device comprising:
   a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and
   a detection device with a detection area for detecting a predetermined positional state and/or for detecting a number of the lids arranged on the conveyor device in a respective receiving area;
   wherein the method comprises:
   Providing the lids in a storage container,
   Conveying the lids from the storage container by means of the conveyor device,
   Pre-separating of the lids by means of an ascending arrangement of the conveyor device and/or by means of a structural design of a receiving area of the conveyor device, and
   Generating a detection signal by means of the detection device when a predetermined number of lids in a receiving area is exceeded and/or when one or more lids are not arranged in the predetermined position in one of the receiving areas, wherein a control device is provided that receives the detection signals from the detection device and controls a discharge device on the basis of these detection signals in order to remove one or more lids from a receiving area when this receiving area does not contain the predetermined number of lids and/or one or more incorrectly oriented lids.

11. The method according to claim 10 further comprising:
   Discharge of one or more lids from a receiving area, of the several receiving areas of the conveyor device, arranged in a discharge section by means of the discharge device.

12. The method according to claim 11 further comprising:
   Output of one or more lids from a receiving area, of the several receiving areas of the conveyor device, arranged in an output area using an output device.

13. The method according to claim 12 further comprising:
   Further transport of the lid or lids by means of a chute.

14. A method for separating and providing lids with a separating device for providing of one or more of the lids, the separating device comprising:
   a conveyor device for receiving and transporting lids in one transport direction, comprising a conveyor belt and several receiving areas formed on the conveyor belt for receiving at least one lid each, the conveyor device being inclined at a predetermined angle with respect to the horizontal at least in a pre-separation section in such a way that the transport direction is designed for the upward transport of the lids, and wherein the receiving areas are each limited at least downwards by a stud holding structure, and
   a detection device with a detection area for detecting a predetermined positional state and/or for detecting a number of the lids arranged on the conveyor device in a respective receiving area;
   wherein the method comprises:
   Providing the lids in a storage container,
   Conveying the lids from the storage container by means of the conveyor device,
   Pre-separating of the lids by means of an ascending arrangement of the conveyor device and/or by means of a structural design of a receiving area of the conveyor device, and
   Receiving lids from a chute by means of the conveyor device, the conveyor device comprising a receiving section and a transport section adjacent to it, and the receiving section of the conveyor device being inclined in such a way that a chute can be coupled to it, so that the material to be conveyed can slide continuously from the chute onto the conveyor device in the receiving section, the conveyor belt in the receiving section being aligned with its transport direction approximately orthogonal to the sliding direction, and stopping the conveyed material sliding from the chute onto the conveyor belt by means of a stop device, whereby the stop device is arranged on the opposite side of the conveyor belt in the receiving section on the chute.

15. The method according to claim 14 further comprising: transferring the conveyed material from the receiving section, wherein the conveyor belt is twisted in a transition from the receiving section to the transport section in such a way that the conveyor belt inclined in the receiving section is arranged horizontally in the transport section, so that the conveyed material is discharged in the horizontal direction.

\* \* \* \* \*